United States Patent [19]

Brüggen et al.

[11] Patent Number: 4,958,515
[45] Date of Patent: Sep. 25, 1990

[54] SPARK PLUG WITH A MEASUREMENT DEVICE

[75] Inventors: Gerhard Brüggen, Stuttgart; Winfried Keiper, Korntal-Münchingen; Leo Steinke, Waiblingen-Hegnach, all of Fed. Rep. of Germany

[73] Assignee: Robert Bosch GmbH, Stuttgart, Fed. Rep. of Germany

[21] Appl. No.: 314,580

[22] PCT Filed: Aug. 8, 1987

[86] PCT No.: PCT/DE87/00348
§ 371 Date: Jan. 25, 1989
§ 102(e) Date: Jan. 25, 1989

[87] PCT Pub. No.: WO88/02108
PCT Pub. Date: Mar. 24, 1988

[30] Foreign Application Priority Data

Sep. 13, 1986 [DE] Fed. Rep. of Germany ....... 3631243

[51] Int. Cl.⁵ ........................................... G01M 15/00
[52] U.S. Cl. ..................................................... 73/116
[58] Field of Search ............... 73/35, 116, 119 R, 120, 73/649; 310/348

[56] References Cited

U.S. PATENT DOCUMENTS

| 903,090 | 11/1908 | Hopkins | 136/224 |
| 1,907,415 | 5/1933 | Carpenter et al. | 73/35 |
| 3,020,763 | 2/1962 | Davis . | |
| 3,703,825 | 11/1972 | Merlo | 73/116 |
| 3,783,681 | 1/1974 | Hirt et al. | 73/119 R |
| 4,169,388 | 10/1979 | Teitelbaum et al. . | |
| 4,730,484 | 3/1988 | Olschefski | 73/119 R |

FOREIGN PATENT DOCUMENTS

| 0413428 | 12/1966 | Fed. Rep. of Germany | 73/115 |
| 3213428 | 10/1983 | Fed. Rep. of Germany . | |
| 0158322 | 8/1985 | Japan . | |
| 0201231 | 10/1985 | Japan . | |
| 0985732 | 12/1982 | U.S.S.R. | 73/116 |

Primary Examiner—Robert R. Raevis
Attorney, Agent, or Firm—Michael J. Striker

[57] ABSTRACT

A spark plug for use in an internal combustion engine and comprising a movement sensor located in the region of the upsetting and heat-shrink area of the spark plug housing for sensing movement resulting from movement of movable parts of the engine such as pistons, valves, etc.

7 Claims, 1 Drawing Sheet

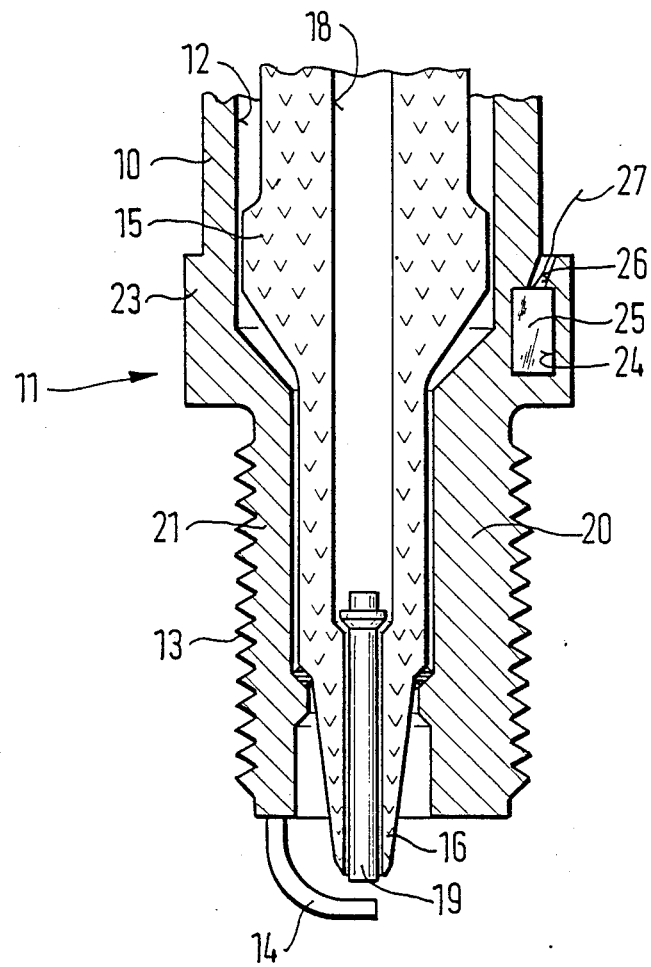

SPARK PLUG WITH A MEASUREMENT DEVICE

BACKGROUND OF THE INVENTION

The invention relates to a spark plug with a measurement device. In a known spark plug of this kind a pressure measurement device, which is connected with the combustion chamber, is arranged within the housing of the spark plug. However, it can determine only the combustion gas pressure. Occurring accelerations must be compensated for, since they falsify the measurement signals. In addition, it is known to arrange sensors at the spark plug for determining the knocking. However, these sensors are designed in such a way that they pick up narrow-band vibrations and transmit corresponding electric signals. These sensors must selectively measure the narrow range in which knocking occurs. In this case, also, only the sequence of the combustion process is monitored. The movement of mechanical parts such as valves, pistons, etc. cannot be determined. Their movement was previously measured individually by sensors arranged at a respective mechanical part.

SUMMARY OF THE INVENTION

The object of the invention is to provide a spark plug with a sensor that only measures the movements resulting from the combustion and the mechanically moved parts of the engine such as e.g. pistons, valves and bearing play. The object of the invention is achieved by providing a spark plug with a movement sensor located in the upsetting and heat-shrink area of the spark plug housing. The processes in the combustion chamber itself are not determined. Whereas previous devices determined according to the present invention the processes in the combustion chamber, the sensor monitors the movement of the mechanical parts. The vibrations and accelerations, respectively, which result from their movement, are transmitted to the engine block and determined by the sensor. It is known which parts vibrate in which frequency ranges. If the received signals change, then conclusions may be drawn about the operating state of the internal combustion engine. A large range may be detected by means of a wide-band sensor, so that a large number of parts are monitored. It is possible to draw conclusions about the monitored part and its change from the frequency of the received signals. The use of a wide-band vibration receiver (up to approximately 200 kHz) enables a high time resolution of the individual received signals. The operating state and the functioning of the engine can be monitored continuously during driving as well as during checks in the workshop. The sensor is arranged securely in a bore in the housing of the spark plug, so that it has a certain resistance against shaking, i.e. it cannot change its position during stresses occurring during operation and can accordingly not bring about faulty measurements. Because of the asymmetrical arrangement of the central bore of the spark plug with the insulating body, no external structural changes in the housing of the spark plug are necessary, so that the spark plug can easily be used in previous arrangements. Accordingly, there is sufficient constructional space for the sensor in the housing of the spark plug. When the construction remains constant, the engine can only be re-equipped by means of exchanging the spark plug with or without the sensor. Each part no longer needs its own sensor which, in addition, is not exchangeable.

The invention as to its construction so as its method of operation, together with additional objects and advantages thereof, will be best understood from the following detailed description of the preferred embodiment with reference to the accompanying drawings.

BRIEF DESCRIPTION OF THE DRAWINGS

The single FIGURE shows a longitudinal sectional view of a spark plug according to the present invention with a built-in sensor.

DESCRIPTION OF THE PREFERRED EMBODIMENT

An eccentric longitudinal bore hole 12 is constructed in the housing 10 of a spark plug 11. The housing 10 can be screwed into an engine block by means of an external thread 13 in a conventional known manner. The housing 10 ends in a ground electrode 14 at its end of the combustion chamber side. An insulating body 15, whose insulator base tip 16 faces the ground electrode 14, is arranged in the longitudinal bore hole 12. In addition, the insulating body 15 comprises a central longitudinal bore hole 18 in which is arranged a connection pin, not shown here, and a center electrode 19. The center electrode 19 and the ground electrode 14 together form the spark gap for the spark plug 11.

Because of the eccentric arrangement of the longitudinal bore hole 12, housing parts with a thick 20 and a thin wall thickness 21 are formed. In the area of the upsetting and heat-shrinkage zone 23 of the housing 10, which adjoins the thread 13, a recess 24 is constructed in the housing part 20 with the thicker wall thickness. A sensor 25 is arranged in this recess 24. The electric connections 27 of the sensor 25 lead outward via a bore 26 to an electronic evaluating circuit, not shown, in which the measuring signal is evaluated.

The sensor 25 can be a conventionally known sensor comprising piezoelectric elements or piezoresistive or electrodynamic elements. It is important in selecting the sensor 25 that it determine the movements transmitted to the engine block by mechanical parts. The sensor 25 should comprise a resonance spectrum with the widest band possible and should be able to receive frequencies up to approximately 200 kHz. A sensor which uses the piezoelectric effect, e.g. consists of ceramic, has proven particularly advantageous.

The spark plug 10 and the sensor 25 together form a compact unit which is easily exchangeable and can be installed in the engine block without modifications. It is no longer necessary to mount individual contactless sensors on the valves or pistons.

It is particularly advantageous that the longitudinal bore 12 have an eccentric construction, and a housing part 20 with a thicker wall is accordingly formed, in which there is formed additional constructional space for the sensor 25.

The functioning of a spark plug is sufficiently known and is therefore not discussed here in more detail.

While the invention has been illustrated and described with reference to a specific embodiment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A spark plug for use in an internal combustion engine having a motor block and mechanically movable parts, said spark plug comprising spark-producing means; a housing for supporting said spark-producing means and having a wall; means for mounting said housing in an engine block of an internal combustion engine so that movements of the mechanically movable parts of the internal combustion engine are transmitted to the engine block and from the latter are transmitted to said housing; and a movement sensor located in said wall of said housing for sensing movements of said housing which have been transmitted to the latter from the mechanically movable parts of the internal combustion engine through the engine block.

2. A spark plug according to claim 1 wherein said housing has an axis and longitudinal bore which is eccentric relative to said axis, said wall being an integral one piece wall and having two portions of different thicknesses defining said eccentric longitudinal bore, said movement sensor being located in the wall portion having a greater thickness.

3. A spark plug according to claim 2 wherein said wall portion of a greater thickness has a recess for receiving said movement sensor.

4. A spark plug according to claim 1 wherein said movement sensor is a vibration sensor.

5. A spark plug according to claim 1 wherein said movement sensor comprises a piezoelectric element.

6. A spark plug according to claim 1, wherein said housing has a longitudinal bore, and further comprising an insulation body located in said longitudinal bore.

7. A spark plug according to claim 6, wherein said wall of said housing has an upsetting and heat-shrink area, said movement sensor being located in said upsetting and heat-shrink area.

* * * * *